(12) United States Patent
Quan et al.

(10) Patent No.: US 11,303,506 B2
(45) Date of Patent: Apr. 12, 2022

(54) METHOD, REMOTE DEVICE AND COMPUTER-READABLE MEDIUM FOR RESELECTING PRINCIPAL CORE DEVICE

(71) Applicant: NOKIA SOLUTIONS AND NETWORKS OY, Espoo (FI)

(72) Inventors: Shengcheng Quan, Qingdao (CN); Yaoyao Du, Qingdao (CN); Peng Wang, Qingdao (CN); Shangning Hui, Qingdao (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 33 days.

(21) Appl. No.: 16/441,664

(22) Filed: Jun. 14, 2019

(65) Prior Publication Data

US 2019/0386871 A1  Dec. 19, 2019

(30) Foreign Application Priority Data

Jun. 15, 2018  (CN) .......................... 201810623274.4

(51) Int. Cl.
*H04L 12/24* (2006.01)
*H04L 41/0668* (2022.01)
(Continued)

(52) U.S. Cl.
CPC ........ *H04L 41/0668* (2013.01); *H04L 1/0025* (2013.01); *H04L 12/2801* (2013.01);
(Continued)

(58) Field of Classification Search
CPC .............. H04L 41/0668; H04L 1/0025; H04L 12/2801
(Continued)

(56) References Cited

U.S. PATENT DOCUMENTS

| 7,058,007 B1 | 6/2006 | Daruwalla et al. |
| 2011/0119453 A1 | 5/2011 | Xu et al. |

(Continued)

FOREIGN PATENT DOCUMENTS

| WO | 2015006143 A1 | 1/2015 |
| WO | 2017205689 A1 | 11/2017 |

OTHER PUBLICATIONS

Nov. 6, 2019 Extended Search Report issued in European Patent Application No. 19180600.9.
(Continued)

*Primary Examiner* — Sibte H Bukhari
(74) *Attorney, Agent, or Firm* — Squire Patton Boggs (US) LLP (57) ABSTRACT

Embodiments of the present disclosure provide a communication method, a remote device and a computer readable medium. In this method, a remote device receives from one of a plurality of core devices connected to the remote device, configuration indicating a priority of at least one of the plurality of core devices for serving as a principal core device of the remote device. The remote device updates priorities of the plurality of core devices for serving as the principal core device based on the configuration. In response to a trigger condition for a switchover being satisfied, the remote device reselects the principal core device of the remote device from the plurality of core devices based on the updated priorities. Embodiments of the present disclosure improve the process that a remote device reselects a principal core device.

11 Claims, 6 Drawing Sheets

(51) Int. Cl.
*H04L 1/00* (2006.01)
*H04L 12/28* (2006.01)
*H04L 41/044* (2022.01)
*H04L 43/0817* (2022.01)

(52) U.S. Cl.
CPC ........ *H04L 12/287* (2013.01); *H04L 12/2861* (2013.01); *H04L 12/2865* (2013.01); *H04L 41/044* (2013.01); *H04L 43/0817* (2013.01)

(58) Field of Classification Search
USPC .......................................................... 709/223
See application file for complete search history.

(56) References Cited

U.S. PATENT DOCUMENTS

| | | | |
|---|---|---|---|
| 2012/0257491 A1 | 10/2012 | Mongeau et al. | |
| 2014/0280541 A1* | 9/2014 | Walter | H04L 67/30 709/204 |
| 2016/0366052 A1* | 12/2016 | Chapman | H04L 45/66 |
| 2017/0344444 A1* | 11/2017 | Costa-Roberts | H04L 41/0668 |
| 2018/0368037 A1* | 12/2018 | Wang | H04L 43/0888 |

OTHER PUBLICATIONS

Communication pursuant to Article 94(3) EPC issued in corresponding European Patent Application No. 19 180 600.9 dated Apr. 7, 2021.

\* cited by examiner

METHOD, REMOTE DEVICE AND COMPUTER-READABLE MEDIUM FOR RESELECTING PRINCIPAL CORE DEVICE

FIELD

Embodiments of the present disclosure generally relate to the field of communications, and more specifically, to a method, a remote device and a computer-readable medium for reselecting a principal core device.

BACKGROUND

Data-over-cable service interface specifications (DOCSIS) are international standards developed by CableLabs which is a cable standard organization. The DOCSIS defines interfaces for communication and operational support required for providing data services over a cable. Its formulation enables high-speed data communication on existing cable television systems. It is adopted by many cable operators on an existing fiber-optic hybrid coaxial cable (HFC) infrastructure, for providing Internet access.

In the DOCSIS, a remote physical (PHY) technology allows a cable modem termination system (CMTS) to support IP based digital HFC apparatus which uses a Layer 3 pseudo-wire between a converged cable access platform (CCAP) core and a remote PHY device. A remote physical device (RPD) set up connections with a principal CCAP core and at least one auxiliary CCAP core. A current specification describes a remote PHY device stores all CCAP cores connected to it according to a certain order. However, there is currently no effective technical solution when the remote PHY device needs to switch or reselect the principal CCAP core.

SUMMARY

Embodiments of the present disclosure relate to a method, a remote device and a computer-readable medium for reselecting a principal core device.

In accordance with the first aspect of the present application, there is provided a method for communication. The method comprises: receiving, at a remote device and from one of a plurality of core devices connected to the remote device, the configuration indicating a priority of at least one of the plurality of core devices for serving as a principal core device of the remote device. The method also comprises: updating priorities of the plurality of core devices for serving as the principal core device based on the configuration. The method further comprises: in response to a trigger condition for a switchover being satisfied, reselecting the principal core device of the remote device from the plurality of core devices based on the updated priorities.

In accordance with the second aspect of the present application, there is provided a remote device. The remote device comprises at least one processor and at least one memory comprising computer program instructions. The at least one memory and the computer program instructions are configured, with the at least one processor, to cause the remote device to receive, from one of a plurality of core devices connected to the remote device, configuration indicating a priority of at least one of the plurality of core devices for serving as a principal core device of the remote device. The at least one memory and the computer program instructions are also configured, with the at least one processor, to cause the remote device to update priorities of the plurality of core devices for serving as the principal core device based on the configuration. The at least one memory and the computer program instructions are further configured, with the at least one processor, to cause the remote device to, in response to a trigger condition for a switchover being satisfied, reselect the principal core device of the remote device from the plurality of core device based on the updated priorities.

In accordance with the third aspect of the present application, it provides a computer-readable medium comprising machine-executable instructions which, when executed, cause a machine to perform a method of the first aspect.

It should be understood that the content of the present disclosure is not intended to limit the scope of the present disclosure. Other features of the present disclosure will be readily understood by the following description.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

Throughout the drawings, the same or similar reference numerals are used to denote the same or similar components.

DETAILED DESCRIPTION OF EMBODIMENTS

Principles of example embodiments disclosed herein will now be described with reference to various example embodiments illustrated in the drawings. It should be appreciated that description of those embodiments is merely to enable those skilled in the art to better understand and further implement example embodiments disclosed herein and is not intended for limiting the scope disclosed herein in any manner.

As used herein, the term "includes" and its variants are to be read as open-ended terms that mean "includes, but is not limited to." The term "based on" is to be read as "based at least in part on." The term "one example embodiment" and "an example embodiment" are to be read as "at least one example embodiment." The terms "first", "second" and the like may refer to different or identical objects. Other explicit and implicit definitions may also be included below.

As used herein, the term "determine" encompasses a wide variety of actions. For example, "determine" may include calculating, computing, processing, deriving, investigating, looking up (for example, looking up in a table, a database, or another data structure), ascertaining, and the like. Further, "determine" may include receiving (for example, receiving information), accessing (for example, accessing data in memory), and the like. Further, "determine" may include parsing, selecting, choosing, establishing, and the like.

The term "remote device" as used herein generally refers to a component that has a network interface on one side and a radio frequency (RF) interface on the other side. The "remote device" can provide a Layer 1 physical (PHY) conversion, a Layer 2 medium access control (MAC) conversion, and a Layer 3 pseudo-wire support. A RF output of the "remote device" may be an RF combined with other overlay services (such as analog or digital video services). An example of the "remote device" may be a "remote PHY device (RPD)" in the DOCSIS standard, but it will be understood that the "remote device" herein may also be any device having a similar function and operation as the remote PHY device in any communication system.

The term "core device" as used herein generally refers to a device that includes a conventional cable modem termination system (CMTS) function, but does not include function that is performed in a "remote device". The "core device" contains a downstream MAC, an upstream MAC, and all initialization and operational software. An example of the "core device" may be a "CCAP Core" in the DOCSIS standard, but it will be understood that the "core device" herein may also be any device having a similar function and operation to the CCAP core in any communication system.

The term "circuit" as used herein refers to one or more of the following: (a) hardware circuit implementation only (such as analog and/or digital circuit implementation only); and (b) a combination of hardware circuit and software, such as (if applicable): (i) a combination of analog and/or digital hardware circuit and software/firmware, and (ii) a combination of any part of hardware processor and software (including a digital signal processor, software and memory working together to make devices such as an OLT or other computing devices that perform various functions; and (c) a hardware circuit and/or a processor, such as a microprocessor or a part of the microprocessor that requires software (for example, firmware) for operation, but there may be no software when software for the operation is not needed.

The definition of the circuit applies to all usage scenarios in this application (including any claim). As a further example, the term "circuit" as used herein also includes only a hardware circuit or a processor (or a plurality of processors), or a hardware circuit or a portion of processor, or an implementation of software or firmware. For example, the term "circuit" also covers a baseband integrated circuit or processor integrated circuit or a similar integrated circuit in an OLT or other computing device, if applicable to a particular claim element.

Figure 1:
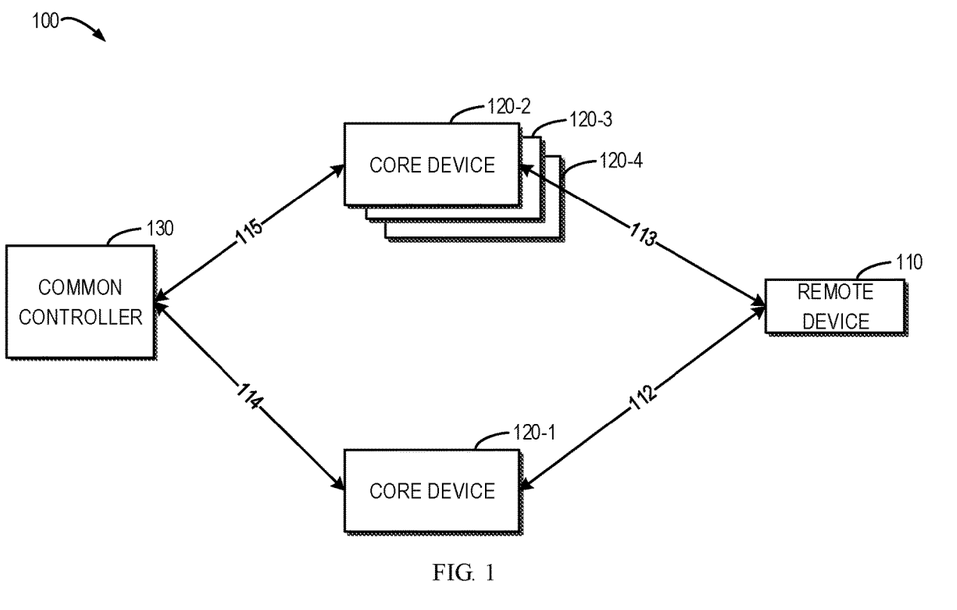
FIG. 1 shows a schematic diagram of a communication system in which embodiments of the present disclosure can be implemented.

FIG. 1 shows a schematic diagram of a communication system 100 in which embodiments of the present disclosure can be implemented. As shown in FIG. 1, the communication system 100 may include a remote device 110 that is connected to a core device 120-1 via a communication link 112. Additionally, the remote device 110 is connected to a core device 120-2 via a communication link 113 and to more core devices 120-3, 120-4, or the like, via more communication links (not shown). In some embodiments, the communication links 112 and 113 and the like between the remote device 110 and core device 120 may include a converged interconnect network (CIN).

In the example depicted in FIG. 1, the core device 120-1 may act as a principal core device of the remote device 110, that is, a final controlling entity of the remote device 110. The core devices 120-2 to 120-4 may act as auxiliary core devices for the remote device 110, which may manage a subset of the remote device 110 resources, such as a particular channel or RF port, and the like. In the context of the present disclosure, the principal core device 120-1 and the auxiliary core devices 120-2 to 120-4 may be collectively referred to as core device 120.

On the other hand, the core device 120-1 is connected to a common controller 130 via a communication link 114, and the core device 120-2 is connected to the common controller 130 via a communication link 115, the core devices 120-3, 120-4 are connected to the common controller 130 via more communication links (not shown). The common controller 130 may perform control to the core device 120, for example performing load balancing for the core devices 120-1 to 120-4, and the like. In some embodiments, the communication links 114 and 115, or the like, between the core device 120 and the common controller 130 may include a wide area network (WAN) or a local area network (LAN).

It should be understood that although FIG. 1 depicts in an exemplary manner that the communication network 100 has a particular number of remote device 110, core device 120, and common controller 130, and they communicate with particular communication links 112-115. However, in other embodiments, the communication network 100 may have any number of remote device, core device, and common controller that may communicate using any suitable communication links in any suitable manner.

As mentioned above, in some scenarios, the remote device may need to select a new principal core device from backup core devices (auxiliary core devices). For example, such a scenario may occur when an operator of the communication network needs to change the principal core device of the remote device, or a current principal core device of the remote device is failed. In current specification, there is no specific solution for re-selection of principal core device. Specifically, the specification only describes that the remote device stores them in a core device identification table in an order in which the core devices appear in a specific field of dynamic host configuration protocol (DHCP), without specifying how the remote device reselects a principal core device.

Therefore, in a scenario where the operator needs to change the principal core devices of the remote device, predetermined rules may only be set such that the remote device dynamically selects an appropriate principal core device. In a scenario where a current principal core device is failed, selection of a new principal core device may depends on the operator's experience, for example, a core device with lower load or higher performance is selected as the new principal core device by the operator. However, this conventional switchover method is not flexible enough. As a result, the remote device cannot adopt an appropriate principal core device selection policy to adapt to different scenarios of principal core devices switchover.

In view of the above problems and other potential problems in the conventional solutions, embodiments of the present disclosure provide a method for reselecting a principal core device, a remote device and a computer readable medium. Through the embodiments of the present disclosure, the remote device can use a unified framework to cover all scenarios of principal core device reselection, and thus can use different principal core device reselection schemes for different scenarios based on the framework. When a certain principal core device reselection scenario occurs, the remote device will trigger a corresponding principal core device reselection scheme. Example embodiments of the present disclosure will be described in detail below with reference to the accompanying drawings.

Figure 2:
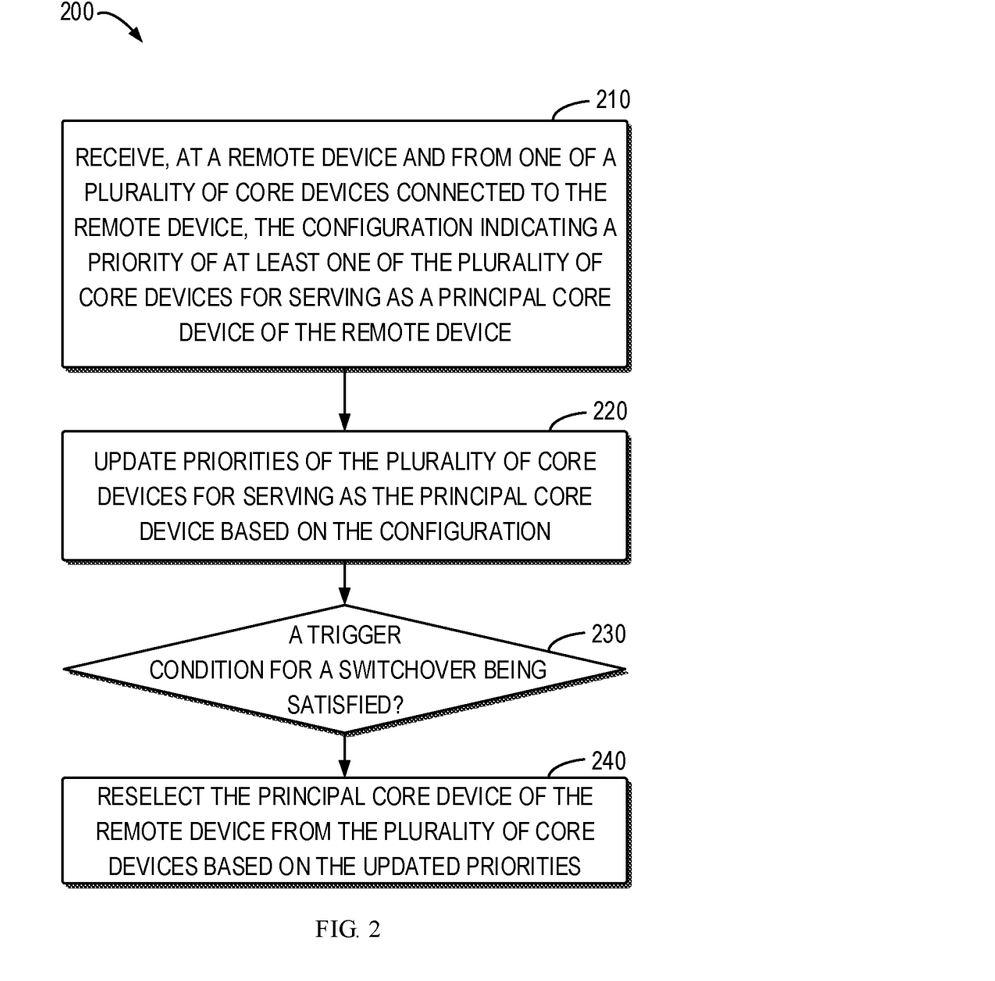
FIG. 2 shows a flow chart of a communication method in accordance with an embodiment of the present disclosure.

FIG. 2 shows a flow chart of a communication method 200 in accordance with an embodiment of the present disclosure. In some embodiments, the method 200 may be implemented by the remote device 110 in the communication network 100, for example, by a processor or processing unit of the remote device 110. In other embodiments, the method 200 may also be implemented by a computing device that is independent of the remote device 110 or may be implemented by other units in the communication network 100. For ease of discussion, the method 200 will be discussed in conjunction with FIG. 1.

At 210, the configuration is received at the remote device 110 from the core device. The core device is one of the plurality of principal devices 120-1 to 120-4 connected to the remote device 110. In some embodiments, the core device that sends the configuration to the remote device 110 may be the current principal core device 120-1. In this way, it can be ensured that the configuration is quickly and reliably transmitted to the remote device 110.

The configuration indicates a priority of at least one of the plurality of core devices 120-1 to 120-4 for serving as a principal core device of the remote device 110. In some embodiments, the configuration may indicate a priority of one core device (for example, the core device 120-2) for serving as the principal core device. In other embodiments, the configuration may also indicate priorities of the plurality of core devices (for example, the core devices 120-2 and 120-3) for serving as the principal core device. It will be appreciated that the core devices involved in this configuration may be any subset of all core devices 120 to which the remote device 110 is connected.

In some embodiments, the priority of the core device 120 connected to the remote device 110 for serving as the principal core device may be visible only to itself, namely, different remote devices may set different core devices to have a same priority.

In addition, in some embodiments, the priority of the core device 120 for serving as the principal core device of the remote device 110 may be represented by a numerical value. For example, in the example of FIG. 1, the priority of the core device 120-1 currently serving as the principal core device may be 9, the priority of the core device 120-2 may be 7, and the priority of the core device 120-3 may be 6, and the priority of the core device 120-4 may be 3, and so on. It should be understood that the specific numerical values of the priority of the core device 120 described above are merely examples, and in other embodiments, the priority of the core device 120 may be expressed using any number or any other means.

In some embodiments, when the remote device 110 initially accesses to the communication network 100, the remote device 110 will initially connect to the core device 120. At this time, the remote device 110 does not have knowledge of the priority of the core device 120. To ensure that setting of initial priority of the remote device 110 to the core device 120 is reasonable, the remote device 110 may, in response to the initial connection to the plurality of core devices 120-1 to 120-4, set a priority of an initially determined principal core device (for example, the core device 120-1) as highest. Priorities of other auxiliary core devices may be specified by a vendor or randomly set.

Additionally, it should be noted that the core devices 120-1 to 120-4 may also be connected to many other remote devices at the same time or perform other functions in communication network 100. Thus, the core devices 120-1 to 120-4 connected to the remote device 110 may have different loads, namely, their loads may not be balanced. For example, a load may include, but is not limited to, CPU/memory usage, an amount of traffic or other system resource usage, and the like.

In this case, as will be described later in detail with respect to FIG. 6, a priority of the at least one core device received by the remote device 110 from the core device 120 may be dynamically adjusted based on load of the plurality of core devices 120-1 to 120-4. In this way, the remote device 110 may reselect a core device with lower load during a switchover of a principal core device, thereby improving accepted service quality and also realizing load balance among the core devices 120-1 to 120-4 to meet predetermined load balancing requirements.

At 220, the remote device 110 updates priorities of the plurality of core devices 120-1 to 120-4 for serving as the principal core device based on the above configuration. In some embodiments, the remote device 110 may first determine priority of which core device or core devices is indicated to be updated in the above configuration, and then the remote device 110 may simply update the stored priority of the core device(s) into a new priority indicated in the above configuration.

In other embodiments, the remote device 110 may organize and manage the priorities of the core devices 120 by way of a table. For example, the table may be referred to as a "core device switchover table" and is saved by the remote device 110, where addresses and the priorities of the core devices 120 connected to the remote device 110 are recorded. In such an embodiment, the remote device 110 may update, based on the configuration received from one of the core devices 120, an entry associated with the at least one core device indicated by the configuration in a stored core device switchover table. By storing and updating the "core device switchover table", the remote device 110 may manage the priorities of the core devices 120 more efficiently and more centrally.

At 230, the remote device 110 determines if a trigger condition for a switchover of principal core device is satisfied. In some embodiments, the trigger condition for the switchover may be the above-described configuration with a flag indicating an immediate switchover of the principal core device. For example, this may be that an operator of the communication network 100 needs to immediately switchover the principal core device of the remote device 110. If the remote device 110 detects a flag indicating an immediate switchover in the above configuration received from the core device 120, the remote device 110 may perform reselection of the principal core device according to the updated priorities after updating the priorities of the core devices 120. In this manner, the operator of the communication network 100 may flexibly and easily customize a selection policy of principal core device of the remote device 110 to accommodate different switchover scenarios.

In other embodiments, the trigger condition for the switchover may also be that the current principal core device 120-1 fails. In such a case, the principal core device 120-1 is no longer able to provide services to the remote device 110, so the remote device 110 will perform reselection of principal core device based on the stored latest priorities of the core devices 120. In this way, the remote device 110 may efficiently and quickly reselect a new principal core device when the principal core device fails, thereby reducing service interruption time and improving user experience. In a further embodiment, the trigger condition for the switchover may include any condition that causes the remote device 110 to require or may require a switchover of the principal core device.

At 240, in response to the trigger condition for the switchover being satisfied, the remote device 110 reselects the principal core device of the remote device 110 from the plurality of core devices 120-1 to 120-4 based on the updated priorities of the core devices 120. How the remote device 110 performs a switchover of principal core device will be described in detail below in conjunction with FIGS. 3-5.

Figure 3:
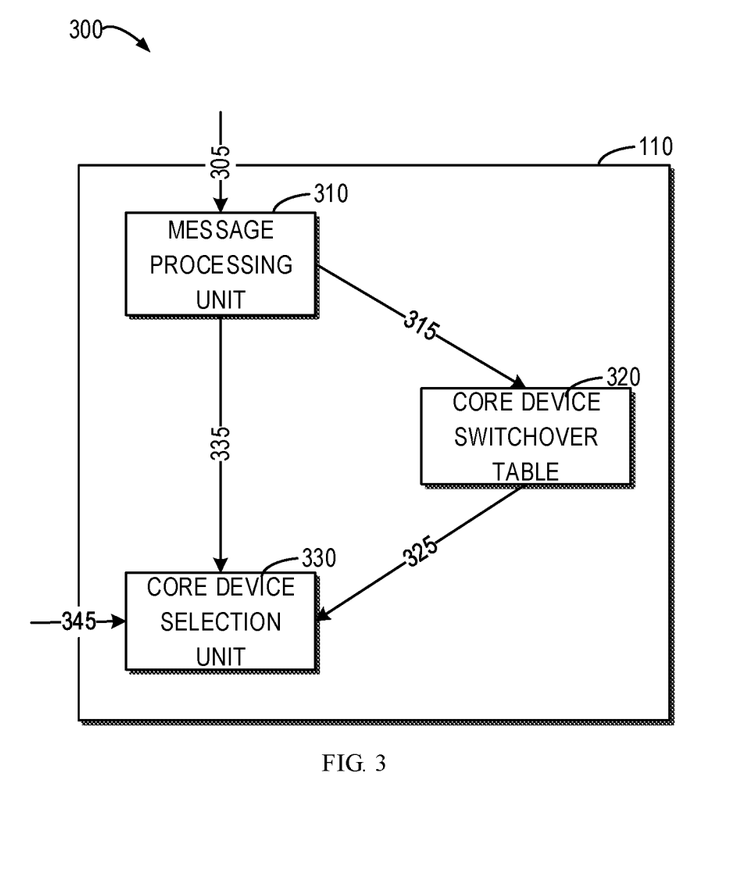
FIG. 3 illustrates a schematic diagram of an operation of a remote device reselecting a principal core device in accordance with an embodiment of the present disclosure.

FIG. 3 illustrates a schematic diagram of an operation of a remote device 110 reselecting a principal core device in accordance with an embodiment of the present disclosure. As shown in FIG. 3, the remote device 110 may include a message processing unit 310, a core device switchover table 320, and a core device selection unit 330. It should be understood that although FIG. 3 depicts the remote device 110 as including a particular unit, this is merely exemplary. In other embodiments, the remote device 110 may include more or fewer units to implement the reselection of principal core device. Moreover, the various units of the remote device 110 depicted in FIG. 3 may be implemented using any suitable manner, such as hardware, firmware, software, or any combination thereof.

The message processing unit 310 may receive 305 a configuration message from, for example, one of the core devices 120 (for example, the current principal core device 120-1) and parse the configuration message to obtain a priority of at least one core device. In some embodiments, the configuration message may be a generic control plane (GCP) message in accordance with the DOCSIS standard. For example, the message may have a following form "remote device ID, core device ID—priority" to indicate a remote device to be configured, a core device whose priority is to be updated, and an updated priority. In some embodiments, a plurality of "core device ID—priority" update information entries may be included in the message.

The message processing unit 310 updates 315 the entries in the core device switchover table 320 based on the received priority of the at least one core device, and these entries records related information of the at least one core device, such as a priority, an IP address, and other information, or the like. The core device switchover table 320 then provides 325 the priority of the updated core device 120 to the core device selection unit 330. In some embodiments, the core device switch table 320 may also store all other information related to a switchover of the principal core device of the remote device 110.

In an internal switchover event, for example, the message processing unit 310 may detect a flag indicating an immediate switchover of the principal core device in the received configuration message. Based on this, the message processing unit 310 may instructs 335 the core device selection unit 330 to perform the principal core device reselection based on the latest priorities of the core devices 120.

On the other hand, in an external switchover event, for example, a failure notification message of the current principal core device 120-1 may be sent 245 to the core device selection unit 330, such that the core device selection unit 330 perform the principal core device reselection based on the latest priorities of the core devices 120.

Figure 4:
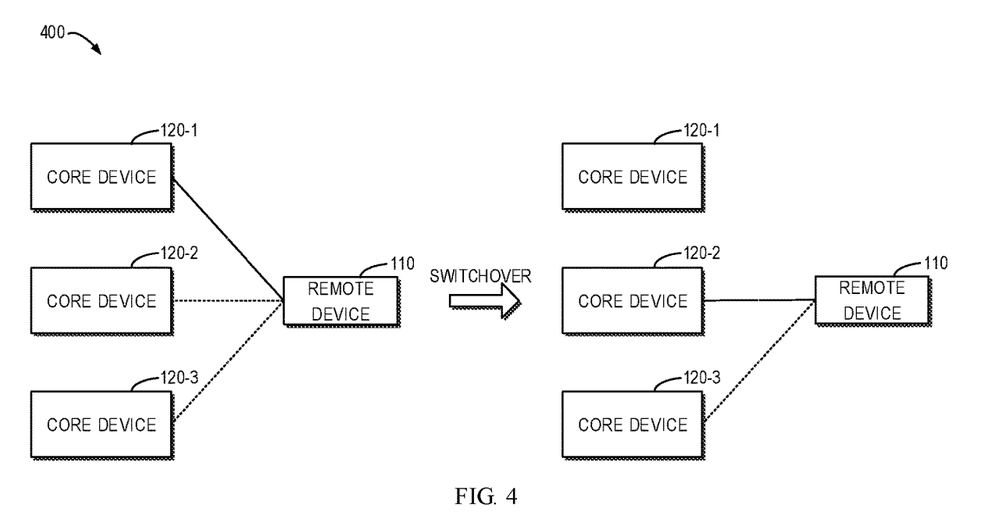
FIG. 4 illustrates a schematic diagram of a principal core device switchover where a principal core device fails in accordance with an embodiment of the present disclosure.

FIG. 4 illustrates a schematic diagram of a principal core device 120-1 switchover where a principal core device 120-1 fails in accordance with an embodiment of the present disclosure. As shown in FIG. 4, before switching, the remote device 110 is connected to the core devices 120-1 to 120-3, respectively, where the core device 120-1 is the principal core device of the remote device 110. In some embodiments, priorities of core devices may be represented by positive integers. The higher the priority of a core device, the higher the priority of the core device for serving as a principal core device.

Under such a priority setting system, the remote device 110 determines a core device having a highest priority among the plurality of core devices 120-1 to 120-4, for example, based on the core device switchover table 320, for example, after updating the configuration message. The core device 120-2 has the highest priority. Before performing a switchover, the remote device 110 determines whether the core device (for example, the core device 120-2) having the highest priority is the same as the current principal core device (for example, the core device 120-1).

In response to the core device 120-2 having the highest priority being different from the current principal core device 120-1, the remote device 110 may set the core device 120-2 having the highest priority as a new principal core device. On the other hand, if the core device having the highest priority is the same as the current principal core device, the remote device 110 may not need to perform the switchover of principal core device. In this manner, the remote device 110 may be prevented from performing a switchover without actual use, thereby saving resources of the remote device 110.

Here, it is assumed that the priority of the core device 120-1 is 9, the priority of the core device 120-2 is 7, and the priority of the core device 120-3 is 5. As shown, at a certain time, the core device 120-1 serving as the principal core device fails, for example, fails and cannot continue to connect to the remote device 110 and provide service to it. In response to the failure of the core device 120-1, the remote device 110 will determine a core device with the highest priority in the remaining core device 120-2 and core device 120-3, for example, the core device 120-2. The remote device 110 then reselects the core device 120-2 for serving as a new principal core device while the core device 120-3 continues to act as its auxiliary core device.

Figure 5:
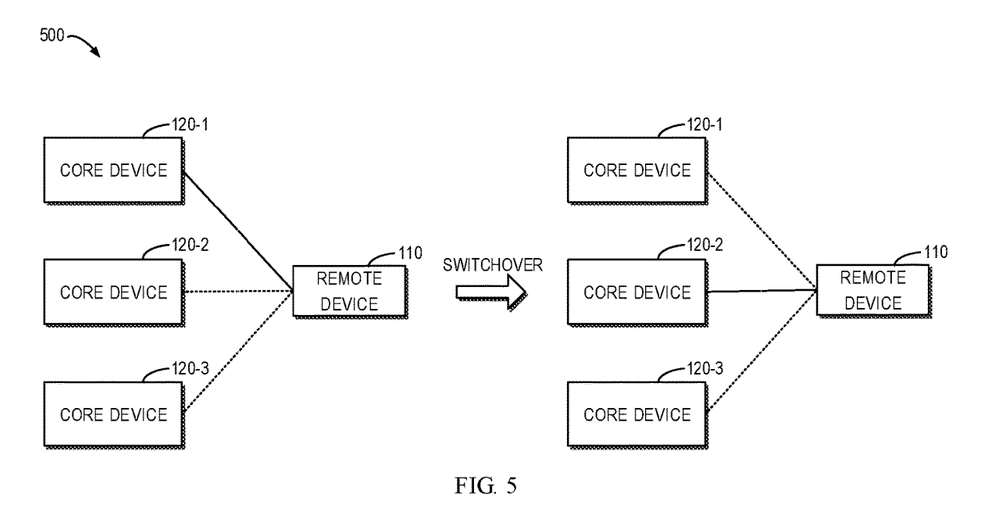
FIG. 5 illustrates a schematic diagram of a principal core device switchover where an operator indicates a switchover in accordance with an embodiment of the present disclosure.

FIG. 5 illustrates a schematic diagram of a principal core device switchover where an operator indicates a switchover in accordance with an embodiment of the present disclosure. Similar to FIG. 4, before switching, the remote device 110 is connected to the core devices 120-1 to 120-3, respectively, wherein the core device 120-1 is the principal core device of the remote device 110. Also similar to FIG. 4, the priority of the core device may be represented by a positive integer. The higher the priority of a core device, the higher the priority of the core device for serving as the principal core device.

Unlike FIG. 4, in the scenario depicted in FIG. 5, the core device 120-1 for serving as the principal core device does not fail, but the operator triggers the switching of the principal core device. For example, an operator may send a configuration message to the remote device 110 via one of the core devices 120-1 to 120-3, which may include a flag indicating an immediate switchover of the principal core device.

For a clearer explanation, it is also assumed that prior to a switchover, the core device 120-1 has a priority of 9, the core device 120-2 has a priority of 7, and the core device 120-3 has a priority of 5. In this case, an operator may send a configuration message to the remote device 110, for example, via the principal core device 120-1, and the priority of the core device 120-2 is set to be 10, which is higher than the priority of 9 of the current core device 120-1. In addition, the operator may set a flag indicating an immediate switchover of the principal core device in the configuration message.

Upon receiving the configuration message, the remote device 110 first updates the priority of the core device 120-2 from 7 to 10. The remote device 110 then immediately performs the switchover of the principal core device in accordance with the indication of the above-mentioned flag. During the switchover process, the remote device 110 determines that the core device 120-2 is the core device that currently has the highest priority, thus reselecting the core device 120-2 for serving as the new principal core device, while the core devices 120-1 and 120-3 for serving as auxiliary core devices.

Figure 6:
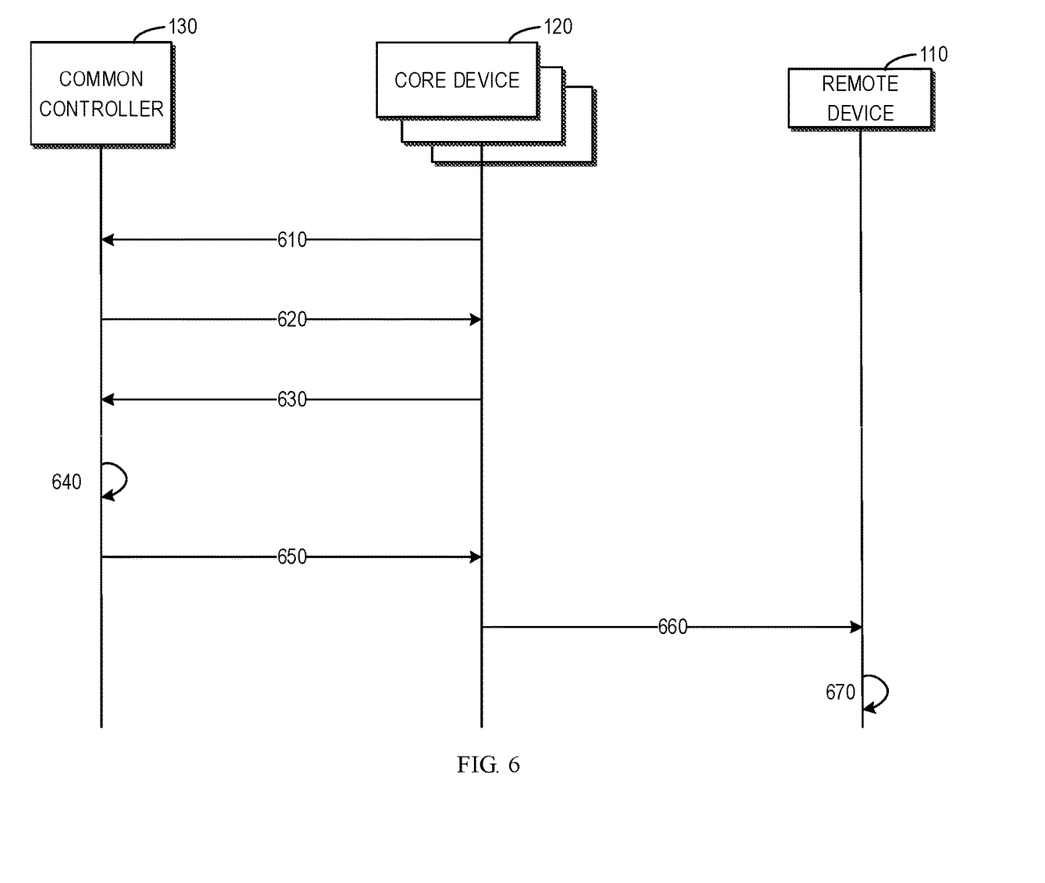
FIG. 6 illustrates an interaction diagram related to a priority setting of a core device in accordance with an embodiment of the present disclosure.

FIG. 6 illustrates an interaction diagram related to a priority setting of a core device 120 in accordance with an embodiment of the present disclosure. As mentioned above, the priorities of the core devices 120 may be dynamically adjusted based on their load, and how to implement a dynamic adjustment via message interactions among the common controller 130, the core device 120, and the remote device 110 will be described below with reference to FIG. 6.

One or more core devices 120 send 610 a resource usage alert to the common controller 130 to notify the common controller 130 that resources of the one or more core devices 120 are insufficient or are about to run out. In response to receiving the resource usage alert, the common controller 130 sends 620 a request to all core devices 120 to obtain resource usage of all the core devices 120.

In response to the above request, all the core devices 120 send 630 their resource usage to the common controller 130. The common controller 130 will then generate 640 a configuration message for configuring the principal core device of the remote device 110 based on the resource usage of all the core devices 120 using a predetermined algorithm (for example, a vendor-specific algorithm). A process of generating 640 the configuration message may involve a command line interface (CLI) or a particular load balancing algorithm in the common controller 130.

The common controller 130 sends 650 the generated configuration message to one of the core devices 120 for example through a Yang protocol. In some embodiments, the configuration message may be a Confd/openflow message. Then, the core device that receives the configuration message may send 660 the configuration message to the remote device 110. Before sending, the core device may perform a message format conversion on the configuration message, for example, into a GCP message. Upon receiving the configuration message, the remote device 110 may update 670 a priority of the core device 120 for serving as its principal core device and perform a switchover of principal core device when a trigger condition for a switchover is satisfied.

In some embodiments, an apparatus (for example, the remote device 110) capable of performing the method 200 may include corresponding components for performing various steps of the method 200. These components may be implemented in any suitable manner, for example, implemented by a circuit or a software module.

In some embodiments, the apparatus includes: means for receiving, at a remote device and from one of a plurality of core devices connected to the remote device, configuration indicating a priority of at least one of the plurality of core devices for serving as a principal core device of the remote device; means for updating priorities of the plurality of core devices for serving as the principal core device based on the configuration; and means for, in response to a trigger condition for a switchover being satisfied, reselecting the principal core device of the remote device from the plurality of core devices based on the updated priorities.

In some embodiments, the means for receiving the configuration comprises a means for receiving the configuration from a current principal core device.

In some embodiments, the means for updating the priorities of the plurality of core devices for serving as the principal core device comprises: means for updating an entry associated with the at least one core device in the core device switchover table stored at the remote device, the core device switchover table recording addresses and the priorities of the plurality of core devices.

In some embodiments, the trigger condition for a switchover comprises at least one of: the configuration having a flag indicating an immediate switchover of the principal core device; a current principal core device being failed.

In some embodiments, the means for reselecting the principal core device comprises: means for determining a core device having a highest priority among the plurality of core devices; and means for, in response to the core device having the highest priority being different from a current principal core device, setting the core device having the highest priority as means of a new principal core device.

In some embodiments, the priority of the at least one core device is dynamically adjusted based on a load of the plurality of core devices.

In some embodiments, the apparatus further comprising means for, in response to the remote device initially connecting to the plurality of core devices, setting a priority of an initially determined principal core device as highest.

In some embodiments, the remote device comprises a remote physical, PHY, device and the core device comprises a converged cable access platform, CCAP, core device.

Embodiments of the present disclosure improve the process of a remote device reselecting a principal core device. In particular, embodiments of the present disclosure may be adapted to various switchover scenarios for selecting a new principal core device, which has high scalability and flexibility, and are easy to implement, thus saving software maintenance costs. In particular, by adding a core device switchover table in the remote device, an operator can conveniently customize a selection policy of principal core device. Moreover, embodiments of the present disclosure are compatible with current DOCSIS standards.

Figure 7:
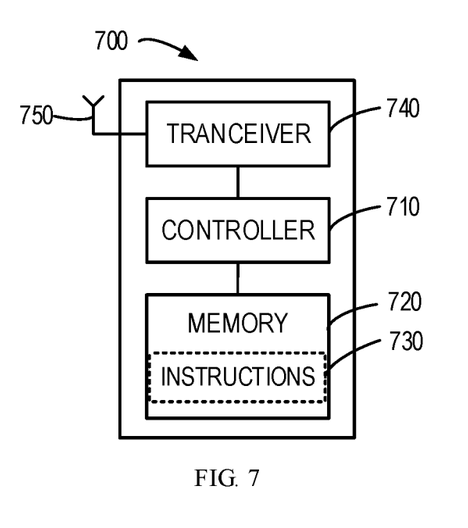
FIG. 7 shows a simplified block diagram of a device suitable for implementing embodiments of the present disclosure.

FIG. 7 shows a simplified block diagram of a device 700 suitable for implementing embodiments of the present disclosure. In some embodiments, the device 700 may be used to implement a remote device, such as the remote device 110 shown in FIG. 1.

As shown in FIG. 7, the device 700 includes a controller 710. The controller 710 controls operations and functionalities of the device 700. For example, in some embodiments, the controller 710 may perform various operations with instructions 730 stored in a memory 720 coupled thereto.

The memory 720 may be of any suitable type suitable for use in a local technical environment and may be implemented using any suitable data storage technology, including but not limited to a semiconductor-based memory device, a magnetic memory device and system, an optical memory devices and system. It should be understood that although only one memory 720 is shown in FIG. 7, there may be a plurality of physically distinct memory units in the device 700.

The controller 710 may be of any suitable type suitable for use in a local technical environment and may include, but is not limited to, a general purpose computer, a special purpose computer, a microcontroller, a digital signal controller (DSP), and one or more of controller-based multi-core controller architectures. The device 700 may also include a plurality of controllers 710. The controller 710 is coupled to a transceiver 740 which may receive and transmit information by means of one or more antennas 750 and/or other components.

When the device 700 acts as a remote device 110, the controller 710, the memory 720, the instructions 730, and the transceiver 740 may operate cooperatively to implement the method 200 described above with respect to FIG. 2. All of the features described above with reference to FIG. 2 to FIG. 6 are applicable to the device 700 and will not be described again herein.

It should be noted that embodiments of the present disclosure may be implemented by hardware, software, or a combination of software and hardware. The hardware portion may be implemented using a dedicated logic; the software portion may be stored in a memory and executed by a suitable instruction execution system, such as a microprocessor or special designed hardware. Those skilled in the art will appreciate that the devices and methods described above may be implemented using computer-executable instructions and/or included in processor control code, for example, this kind of code is provided in a programmable memory or data carrier such as an optical or electronic signal carrier.

By way of example, embodiments of the present disclosure may be described in a context of machine-executable instructions included in a program module that is executed in a device on a real or virtual processor of a target. Generally, a program module includes routines, programs, libraries, objects, classes, components, data structures, and the like, which perform particular tasks or implement particular abstract data structures. In various embodiments, functionalities of the program modules may be combined or divided between the described program modules. Machine-executable instructions for program modules may be executed within a local or distributed device. In a distributed device, program modules may be located in both local and remote storage media.

The computer program code for implementing the methods of the present disclosure may be written in one or more programming languages. The computer program code may be provided to a general purpose computer, a special purpose computer or a processor of other programmable data processing apparatus such that the program code, when executed by a computer or other programmable data processing apparatus, causes the functions/operations specified in a flowchart and/or block diagram to be implemented. The program code may be executed entirely on a computer, partly on the computer, as a stand-alone software package, partly on the computer and partly on the remote computer or entirely on a remote computer or server.

In the context of the present disclosure, computer program code or related data may be carried by any appropriate carrier to enable a device, an apparatus, or a processor to perform the various processes and operations described above. Examples of the carrier include signals, computer-readable media, and the like. Examples of the signals may include electrical, optical, radio, sound, or other forms of propagating signals, such as carrier waves, infrared signals, and the like.

A computer-readable medium may be any tangible medium that may include or store a program for use with or in connection with an instruction execution system, apparatus, or device. The computer-readable medium may be a computer-readable signal medium or a computer-readable storage medium. The computer-readable medium may include, but is not limited to, an electronic, magnetic, optical, electromagnetic, infrared, or semiconductor system, apparatus, or device, or any suitable combination thereof. More detailed examples of the computer-readable storage media include electrical connections with one or more wires, portable computer disks, hard disks, a random access memory (RAM), a read only memory (ROM), an erasable programmable read only memory (EPROM or flash memory), an optical storage device, a magnetic storage device, or any suitable combination thereof.

In addition, although the operations of the methods of the present disclosure are described in a particular order in the figures, this is not a requirement or implied that the operations must be performed in that particular order, or that all illustrated operations must be performed to achieve the desired result. Rather, the steps depicted in the flowcharts may change the order of execution. Additionally or alternatively, certain steps may be omitted; the plurality of steps being combined into one step, and/or one step may be divided into a plurality of steps. It should also be noted that features and functions of two or more devices in accordance with the present disclosure may be embodied in one device. Conversely, features and functions of one of the devices described above may be further divided into a plurality of devices.

The present disclosure has been described with reference to a number of specific embodiments, but it should be understood that the present disclosure is not limited to the specific embodiments disclosed. The present disclosure is intended to cover various modifications and equivalents included in the principle and scopes of the claims.

We claim:
1. A method of communication, comprising:
receiving, at a remote device and from one of a plurality of core devices connected to the remote device, a configuration indicating a priority of at least one of the plurality of core devices for serving as a principal core device of the remote device;
updating priorities of the plurality of core devices for serving as the principal core device based on the configuration; and
in response to a trigger condition for a switchover being satisfied, reselecting, by the remote device, the principal core device of the remote device from the plurality of core devices based on the updated priorities,
wherein reselecting the principal core device from the plurality of core devices based on the updated priorities comprises:
determining a core device having a highest priority among the plurality of core devices; and
in response to the core device having the highest priority being different from a current principal core device, setting the core device having the highest priority as a new principal core device,
wherein the trigger condition for the switchover comprises at least one of: the configuration having a flag indicating an immediate switchover of the principal core device, and a current principal core device being failed, and wherein the remote device comprises a remote physical, PHY, device and the core device comprises a converged cable access platform, CCAP, core device.

2. The method of claim 1, wherein receiving the configuration from the core device comprises:
receiving the configuration from a current principal core device.

3. The method of claim 1, wherein updating the priorities of the plurality of core devices for serving as the principal core device comprises:
updating an entry associated with the at least one core device in a core device switchover table stored at the remote device, the core device switchover table recording addresses and the priorities of the plurality of core devices.

4. The method of claim 1, wherein the priority of the at least one core device is dynamically adjusted based on a load of the plurality of core devices.

5. The method of claim 1, further comprising:
in response to the remote device initially connecting to the plurality of core devices, setting a priority of an initially determined principal core device as highest.

6. A remote device, comprising:
at least one processor; and
at least one memory having computer program instructions, the at least one memory and the computer program instructions being configured, with the at least one processor, to cause the remote device to:
receive from one of a plurality of core devices connected to the remote device, configuration indicating a priority of at least one of the plurality of core devices for serving as a principal core device of the remote device;
update priorities of the plurality of core devices for serving as the principal core device based on the configuration; and
in response to a trigger condition for a switchover being satisfied, reselect the principal core device of the remote device from the plurality of core devices based on the updated priorities,
wherein, to reselect the principal core device, the at least one memory and the computer program instructions are further configured, with the at least one processor, to cause the remote device to:
determine a core device having a highest priority among the plurality of core devices; and
in response to the core device having the highest priority being different from a current principal core device, set the core device having the highest priority as a new principal core device,
wherein the trigger condition for the switchover comprises at least one of: the configuration having a flag indicating an immediate switchover of the principal core device, and a current principal core device being failed, and
wherein the remote device comprises a remote physical, PHY, device and the core device comprises a converged cable access platform, CCAP, core device.

7. The remote device of claim 6, wherein the at least one memory and the computer program instructions are further configured, with the at least one processor, to cause the remote device to:
receive the configuration from a current principal core device.

8. The remote device of claim 6, wherein the at least one memory and the computer program instructions are further configured, with the at least one processor, to cause the remote device to:
update an entry associated with the at least one core device in a core device switchover table stored, the core device switchover table recording addresses and the priorities of the plurality of core devices.

9. The remote device of claim 6, wherein the priority of the at least one core device is dynamically adjusted based on a load of the plurality of core devices.

10. The remote device of claim 6, wherein the at least one memory and the computer program instructions are further configured, with the at least one processor, to cause the remote device to:
in response to the remote device initially connecting to the plurality of core devices, set a priority of an initially determined principal core device as highest.

11. A non-transitory computer-readable medium comprising program instructions encoded thereon which, when executed in hardware, cause a remote device to perform at least the following:
receiving, at the remote device and from one of a plurality of core devices connected to the remote device, a configuration indicating a priority of at least one of the plurality of core devices for serving as a principal core device of the remote device;
updating priorities of the plurality of core devices for serving as the principal core device based on the configuration; and
in response to a trigger condition for a switchover being satisfied, reselecting, by the remote device, the principal core device of the remote device from the plurality of core devices based on the updated priorities,
wherein reselecting the principal core device from the plurality of core devices based on the updated priorities comprises:
determining a core device having a highest priority among the plurality of core devices; and
in response to the core device having the highest priority being different from a current principal core device, setting the core device having the highest priority as a new principal core device,
wherein the trigger condition for the switchover comprises at least one of: the configuration having a flag indicating an immediate switchover of the principal core device, and a current principal core device being failed, and
wherein the remote device comprises a remote physical, PHY, device and the core device comprises a converged cable access platform, CCAP, core device.

* * * * *